(12) United States Patent
Balasubramanian et al.

(10) Patent No.: US 8,549,413 B2
(45) Date of Patent: Oct. 1, 2013

(54) DISCRIMINATING AMONG RESOURCES TO SHARE

(75) Inventors: Swaminathan Balasubramanian, Southfield, MI (US); Ravi P. Bansal, Tampa, FL (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/756,532

(22) Filed: Apr. 8, 2010

(65) Prior Publication Data

US 2011/0252366 A1    Oct. 13, 2011

(51) Int. Cl.
    *G06F 3/048*    (2006.01)
(52) U.S. Cl.
    USPC ........................................ 715/751; 715/809
(58) Field of Classification Search
    USPC ................................. 715/809, 751
    See application file for complete search history.

(56) References Cited

U.S. PATENT DOCUMENTS

| | | | |
|---|---|---|---|
| 5,241,625 A | 8/1993 | Epard et al. | |
| 7,046,134 B2 | 5/2006 | Hansen | |
| 7,415,100 B2 | 8/2008 | Cooper et al. | |
| 2004/0075619 A1* | 4/2004 | Hansen | 345/1.1 |
| 2006/0002315 A1* | 1/2006 | Theurer et al. | 370/261 |
| 2008/0034038 A1* | 2/2008 | Ciudad et al. | 709/204 |
| 2008/0183817 A1 | 7/2008 | Baek et al. | |

OTHER PUBLICATIONS

Tee; Providing Artifact Awareness to a Distributed Group through Screen Sharing; CSCW '06 Article; pp. 1-10 Date: Nov. 4, 2006; ACM; Banff, Alberta, Canada.

Nieh; Experiences Teaching Operating Systems Using Virtual Platforms and Linux; Article from Proceedings of the 36th SIGCSE Technical Symposium on Computer Science Education; Date: Feb. 2005; ACM; New York, NY, US.

* cited by examiner

*Primary Examiner* — Andrea Leggett
(74) *Attorney, Agent, or Firm* — Arthur Samodovitz; Robert C. Rolnik

(57) ABSTRACT

An activity tracker defines a context for a screen sharing session, wherein the context includes at least one term of metadata. The activity tracker establishes a shared link to a second computer, comprising authenticating the second computer. The activity tracker shares at least a first resource rendered by a first application, wherein the first application renders data of the first resource. The activity tracker receives a preliminary user input to access a second resource, wherein the preliminary user input to access is a command to render a resource. The activity tracker or sharing controller renders the second resource to form a rendered second resource, wherein a computer environment comprises the first resource and the second resource. The activity tracker determines that the second resource fails to satisfy the context.

17 Claims, 5 Drawing Sheets

DISCRIMINATING AMONG RESOURCES TO SHARE

BACKGROUND OF THE INVENTION

The present invention relates generally to a computer implemented method, data processing system, and computer program product for displaying data across a network. More specifically, the present invention relates to user interaction with a computer used to host or otherwise present information during a screen sharing session.

Modern uses of networked computers provide many opportunities for people in remote offices to collaborate without the difficulties of booking conference rooms and traveling to a conference room to hear and participate in a presentation. Such presentations are normally hosted by a presenter, who shares visual elements displayed on his computer with peers who he has allowed to view selected portions of his screen. This sharing amongst computer users is known as screen sharing.

Screen sharing is a powerful way to display planned presentations, as well as present ad hoc details from applications not entirely controlled by the presenter. Some screen sharing systems do little to distinguish between shared windows and windows privately available. Some merely place a contrasting color border around any window or windows that are made available from a presenter's computer to peers. In a multi-window environment, such a border may be ignored by a presenter, for example during a scheduled break in a presentation, where attendees are encouraged to attend to personal matters. Sometimes, a presenter may attend to a matter irrelevant to the hosted presentation, taking advantage of the break. Sometimes a presenter may terminate their presentation, but neglect to terminate their screen sharing session.

Directly discriminating between shared and unshared windows may be beneficial.

SUMMARY OF THE INVENTION

The present invention provides a computer implemented method, a data processing system, and computer program product for selecting a resource to share in a screen sharing session. An activity tracker defines a context for a screen sharing session, wherein the context includes at least one term of metadata. The activity tracker establishes a shared link to a second computer, comprising authenticating the second computer. The activity tracker shares at least a first resource rendered by a first application, wherein the first application renders data of the first resource. The activity tracker receives a preliminary user input to access a second resource, wherein the preliminary user input to access is a command to render a resource. The activity tracker or sharing controller renders the second resource to form a rendered second resource, wherein a computer environment comprises the first resource and the second resource. The activity tracker determines that the second resource fails to satisfy the context. The activity tracker displays a dialog box, wherein the dialog box prompts the user for a decision whether to share the second resource to the second computer, responsive to a determination that the second resource fails to satisfy the context. The activity tracker may receive a user input to control the data of the second resource. The activity tracker shares the first resource and the second resource based on the user input to the dialog box.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
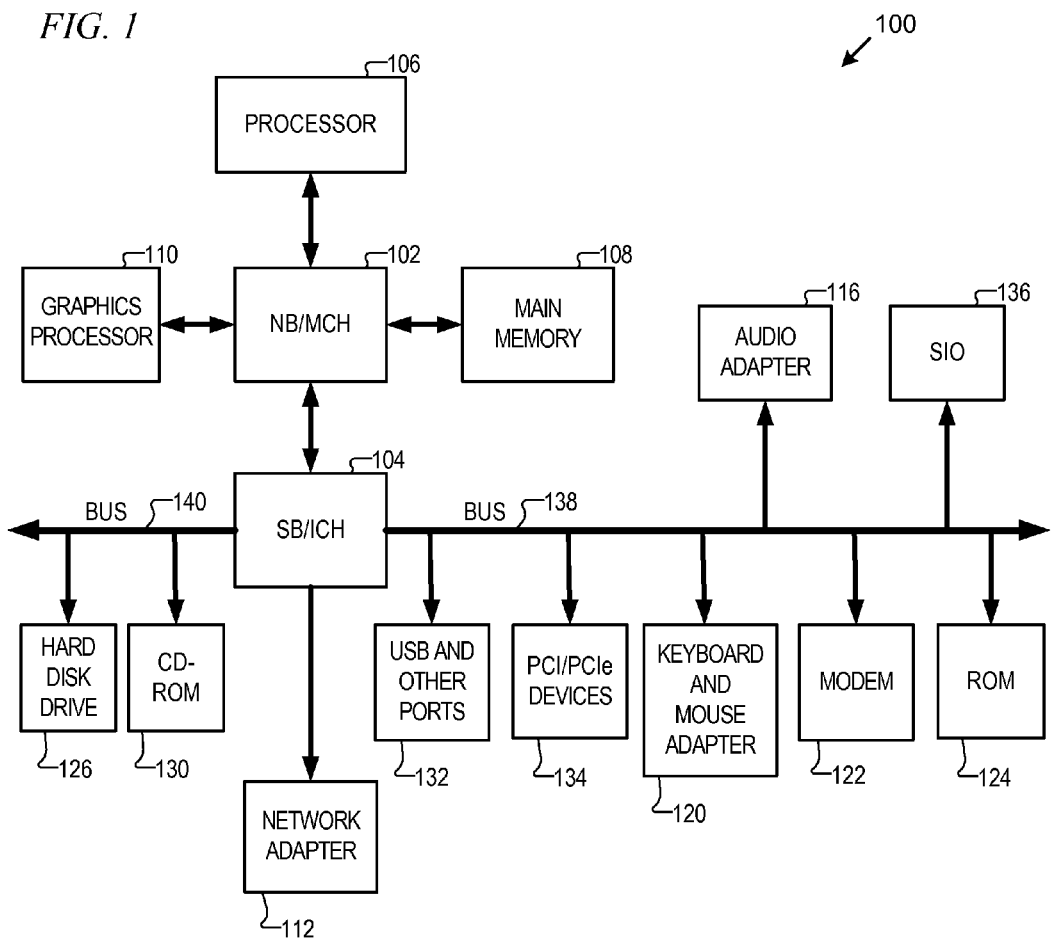
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110, for example, may connect to the NB/MCH through an accelerated graphics port (AGP).

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

A computer readable storage device includes an electronic, magnetic, optical, electromagnetic or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. The term "computer-readable storage device" does not encompass a signal propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit a user or presenter to establish a shared link to a second or peer computer so that one or more resources rendered to the user's screen are available on one or more peer's screens. The presenter may identify a context for the presentation as he begins a screen sharing session by, for example, setting keywords associated with the screen sharing session. An activity tracker may provide a user a moment of repose while he attempts to open fresh windows to render new resources. Responsive to attempts to open the resource, the activity tracker may check metadata associated with the resource to determine if the resource satisfies a context, earlier set, for example, by the presenter. Windows that are not within the context, but opened during a screen sharing session, may be accompanied by a warning or other opportunity for the presenter to avoid widespread dissemination of data that may be irrelevant, embarrassing, or confidential to the presenter within the context of the screen sharing session.

Figure 2:
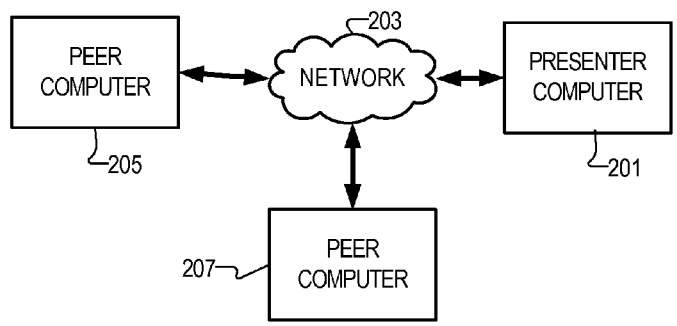
FIG. 2 is a block diagram of an arrangement of a presenting computer with multiple peer computers in accordance with an illustrative embodiment of the invention.

FIG. 2 is a block diagram of an arrangement of a presenting computer with multiple peer computers in accordance with an illustrative embodiment of the invention. Presenter computer 201 may communicate using network 203 to exchange data with peer computers, for example, peer computer 205 and peer computer 207. Network 203 may be, for example, a packet network. Peer computer 207 may exchange information with a local teleconference mechanism. A teleconference mechanism includes any data processing system and/or telephony system that is configured to transfer audio in real time. The teleconference mechanism can include telephony systems, calendar scheduling services (such as IBM® Lotus® Domino® and Microsoft Exchange servers), instant messaging systems, social networking services, location discovery services, and the like. Presenter computer 201, peer computer 205, and peer computer 207 may be implemented as, for example, data processing system 100 of FIG. 1. IBM, Lotus, and Domino are trademarks of International Business Machines Corporation in the United States, other countries, or both. Exchange Server is a trademark of Microsoft Corporation in the United States, other countries, or both.

A teleconference system is a data processing system that provides voice traffic using analog, and/or digital switching to connect to other data processing systems or analog devices. A teleconference system may rely on telecommunications and data communications protocols to communicate with peer devices to route, charge, and/or complete telephone calls. As such, a teleconference system can be, for example a telephone attached to a plain old telephony system. Alternatively, a teleconference system can be a Voice Over Internet Protocol (VoIP) application executing on a data processing system and accessing a packet network to transport signals. As such, the VOIP application may be implemented within and as an application of presenter computer 201 of FIG. 2. An application is a set of computer readable instructions executed on a processor such that the processor accesses memory, storage and/or I/O. When the teleconference system is implemented in a separate device, the teleconference system may communicate to presenter computer 201 over a packet network, or by other means.

Figure 3:
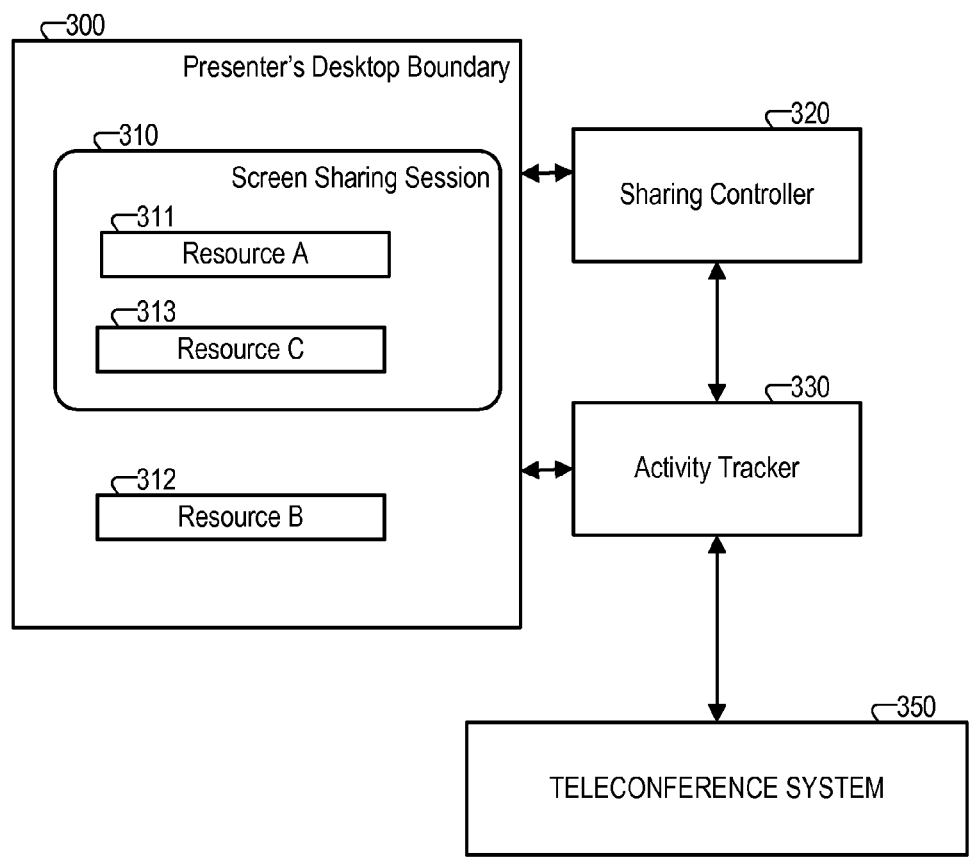
FIG. 3 is a block diagram of software components accessing resources and interacting with support systems in accordance with an illustrative embodiment of the invention.

FIG. 3 is a block diagram of software components accessing resources and interacting with support systems in accordance with an illustrative embodiment of the invention. Memory resources of presenter computer are depicted as presenter's desktop boundary 300. Presenter computer may be as described in relation to FIG. 2 as presenter computer 201. The memory of presenter's desktop boundary 300 may be video memory assigned to one or more displays connected to video card interfaces of the presenter computer, for example video interface of graphics processor 110 of FIG. 1. One or more resources may be accessed by a user during a presentation, and optionally, rendered in signals, and protocol over a network to one or more peer computers, for example, peer computer 205 or peer computer 207 of FIG. 2. One or more resources may be associated with screen sharing session 310. The association of one or more resources to screen sharing session 310 may be by way of a data structure, for example, a log.

A resource can be any file amenable to being rendered to a computer display. A resource can be as simple as an empty text file for which a file name has been selected. A resource can be complex, as, for example, a file that is rendered and played back, for example, data from a DVD. Alternatively, a resource can be a windowed object generated from an application's code and not necessarily a separate object. For example, the resource can be stored to volatile memory such as RAM. As such, the resource can be ad hoc based on a user's dynamic inputs to an application. As an example of such a situation, a presenter may use a word processing application and begin editing from a blank or new document. In such a situation, the resource is the text as it is entered, modified and rendered by the application, in cooperation with the presenter.

A file may be local to a presenter computer, or be accessed across a network by familiar protocols. Protocols can include, for example, Hypertext Transfer Protocol (HTTP), File Transfer Protocol (FTP), among others. Each resource may be associated with one or more applications that can play the resource. When a resource is in a presenter's desktop boundary, the resource is being rendered to at least the display memory of a computer user's or presenter's screen.

A file may be associated with metadata. Metadata is data about data. Common metadata types include, file names, creation dates, user-account ownership of a file, keywords associated with a file, computer name hosting a file, Universally Unique Identifiers (UUIDs), among many other forms of metadata. Words associated with a file can suggest or otherwise provide context of the use of a file. Another example of metadata is a file title. A file title is a field for a title that describes, in summary, what a file is about. Each word present in a file name can operate as metadata. A file may reserve space to describe file contents in summary form. For example, keywords specified in IBM Lotus Symphony Documents format files can be metadata. Alternatively, HyperText Markup Language (HTML) fields tagged with the 'meta' keyword may operate as metadata.

A uniform resource locator may include metadata. For example, the protocol used to access a resource may be metadata, for example, HTTP://, FTP://, TEL, mailto:// and the like. Similarly, a domain name and other particulars of an Uniform Resource Locator (URL) can also serve as metadata.

Sharing controller 320 is an application that mediates between a resource, which is selected to be shared, and the remote peer computers that authenticate, or are otherwise allowed to receive a stream of rendered output. The sharing controller may read a data structure or log that lists resources associated with the screen sharing session. In response to a resource being added to the log, or otherwise being identified as shareable, the sharing controller may render or share the resource to at least one peer computer. Shared resources include, for example, resource A 311, and resource C 313. Additional resource B 312 may be a resource rendered privately to the presenter's computer, but not rendered or otherwise transmitted to any peer computers. Activity tracker 330 is an application that may coordinate selection of a resource or de-selection of a resource into or out of the screen sharing session. A screen sharing session is a set of applications, rendered at least in part, to a presenter's desktop boundary, selected for sharing, and transmitted to at least one peer computer for display local to the peer computer. In other words, the applications, and resources displayed therein, are placed in a display local with respect to the preliminary user input. Depending on the inputs of the user, the resource can be displayed only locally, or can be displayed to peers participating remotely in a presentation.

Teleconference system 350 provides signaling to activity tracker 330 to indicate call progress with one or more peers who are invited to participate in a screen sharing session. Teleconference system 350 is shown external to peer computer in this illustrative embodiment. However, teleconference system 350 may be an application operating within presenter computer in alternative illustrative embodiments. Teleconference system 350 may form a part to a teleconference mechanism, described above. A teleconference mechanism is the one or more data processing systems, routers, twisted pair cable, Ethernet cabling and other network equipment that cooperate together to provide real-time communications.

A resource may be reached from within data available on presenter computer 201 or from any data processing system reachable via network 203. As such, the one or more resources which the presenter may access are collectively context data repositories.

Figure 4:
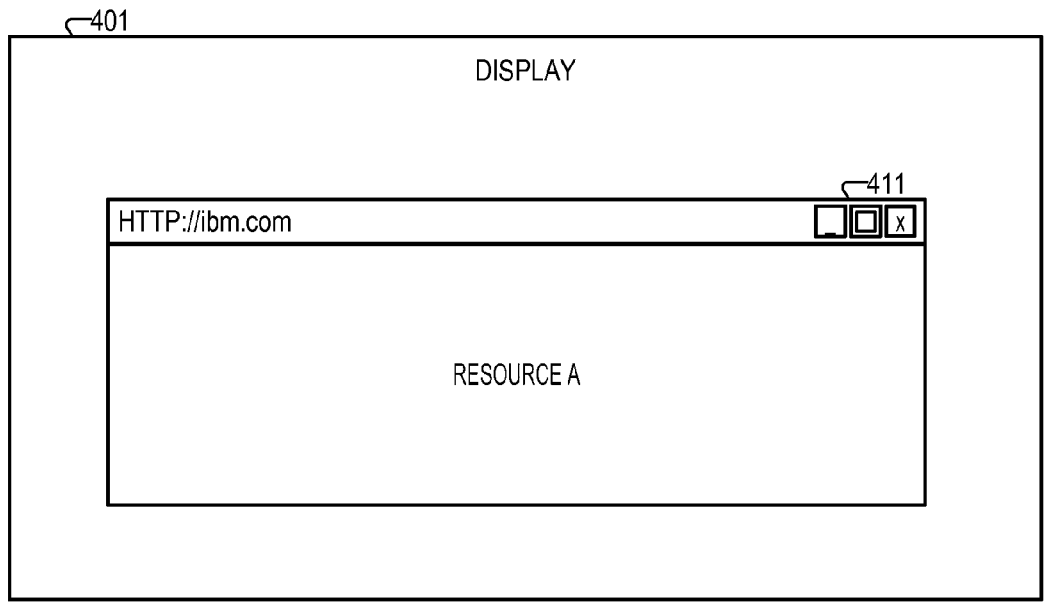
FIG. 4 is a diagram of a display used to show a resource rendered by an application during a screen sharing session during an initial period of operation in accordance with an illustrative embodiment of the invention.

FIG. 4 is a diagram of a display used to show a resource rendered by an application during a screen sharing session during an initial period of operation in accordance with an illustrative embodiment of the invention. Initially, a presenter may select a first resource for sharing, resource A 411. Resource A 411 is displayed to a computer display after being rendered to video memory, for example, using graphics processor 110 of the data processing system of FIG. 1. Computer display 401 may be used to display user controls, icons, and dialog boxes among other display elements used for a screen sharing session, as well as for unrelated computer access. A computer environment is the video memory used to store the matrix of pixels to be sent to the display for illumination. Accordingly, rendering is the process of storing the data to the matrix, where the matrix is one or more sections of physical memory used to store display data. Other methods of display may be used, such as screen readers and other display rendering technologies. A dialog box is a textual prompt displayed within a polygon rendered to computer display 401. The polygon may be, for example, a rectangle, and include user controllable features such as input fields, radio buttons, and scroll controls. Initially, a dialog box may be used to request that the presenter designate a resource to be shared contemporaneously with starting a screen sharing session. A resource may be, for example, a Lotus Symphony™ Presentations file. Lotus Symphony™ is a trademark of International Business Machines Corporation in the United States, other countries, or both.

Figure 5:
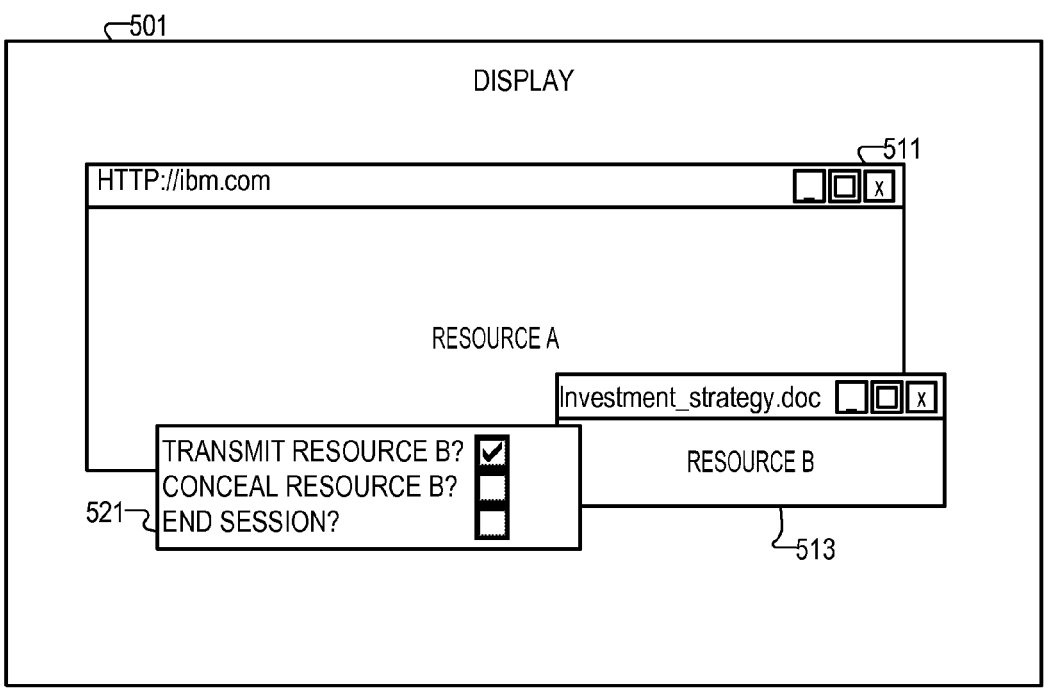
FIG. 5 is a diagram of a display used to show a resource rendered by an application during a follow-up period of operation in accordance with an illustrative embodiment of the invention.

FIG. 5 is a diagram of a display used to show a resource rendered by an application during a follow-up period of operation in accordance with an illustrative embodiment of the invention. At varying stages of a presentation transmitted through the screen sharing session, the presenter may open additional resources or otherwise instruct presenter computer to render resources to presenter's desktop. Computer display 501 contains the resources rendered locally to a presenter's screen. Resource A 511 may be a resource earlier opened by the presenter for sharing with his peers. Resource B 513 may be a resource opened later, and made active by the presenter. With respect to FIG. 3, if the presenter chooses not to share the resource B, then resource B 312 will be displayed to the presenter's display, but not placed in the screen sharing session 310 of FIG. 3. Returning to FIG. 5, dialog box 521 may be a dialog that a presenter computer, executing activity tracker, may display in response to the presenter opening or attempting to open resource B 513. The dialog box may be displayed by the activity tracker to request a presenter acknowledgment that the resource B is not within a context earlier set for the screen sharing session.

Figure 6:
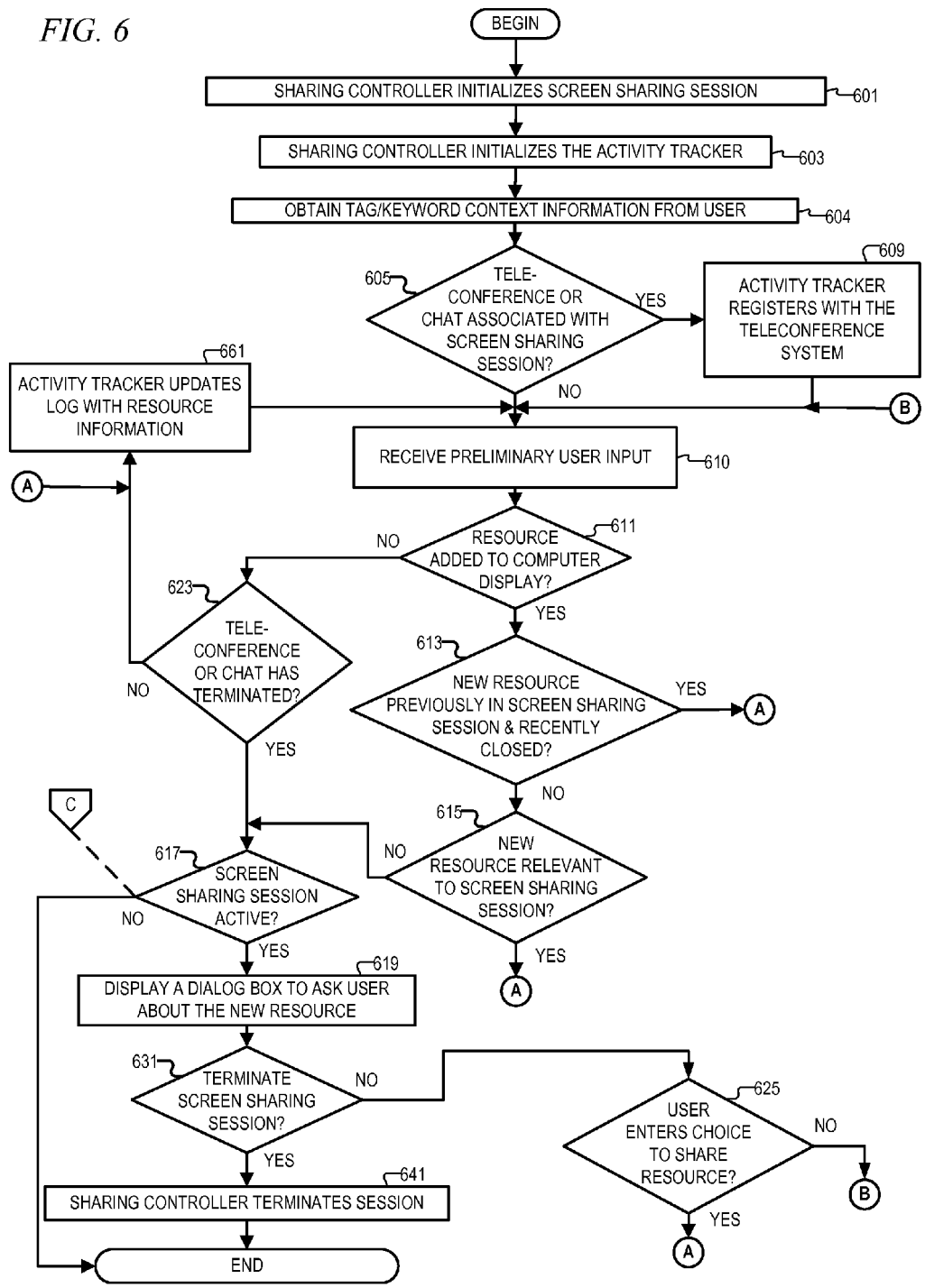
FIG. 6 is a flowchart of steps beginning and maintaining a screen sharing session in accordance with an illustrative embodiment of the invention.

FIG. 6 is a flowchart of steps beginning and maintaining a screen sharing session in accordance with an illustrative embodiment of the invention. Initially, a sharing controller may initialize a screen sharing session (step 601). Next, the sharing controller initializes the activity tracker (step 603). Sharing controller and activity tracker may be as described in FIG. 2, above. Initializing the screen sharing session may include setting a data structure to identify authentic participants invited to see a presentation made by the user of the presenter computer. Such a data structure may be used by a presenter computer to authenticate or otherwise establish shared links to each participant in an asynchronous manner. A shared link is a communication protocol that permits text and/or video content to be passed at least from the presenter computer to a peer computer substantially in real-time. The shared link may rely on the peer computer transmitting credentials to match the data structure established in step 601.

The activity tracker may request that the presenter provide a tag or keyword that will provide context for the continuing sharing session. A context is one or more terms of metadata selected by a user to associate with a screen sharing session. For example, the presenter-provided tag or keyword may form a context. Such a context, may be used to compare keywords of proposed resources added to a presenter's display. Accordingly, the activity tracker may obtain context information from the presenter (step 604). The activity tracker may obtain the context indirectly, for example by looking up keywords associated with a file that the presenter is using in a presentation. The activity tracker may obtain the context directly, for example, by prompting the user or presenter for words to define the context. The prompting may be performed through the use of a dialog box that solicits the presenter for context information.

The activity tracker may maintain keywords that relate to the screen sharing session. Accordingly, when the activity tracker stores such keywords in a data structure, the activity tracker has defined a context for the screen sharing session. A context is the one or more metadata or keywords associated with a screen sharing session. The context may include one or more rules used to determine how to match the terms or keywords to resources. The rules or criteria can include, for example, case-sensitive matching, sound-alike matching, synonym matching, matching plural nouns to singular nouns, and the like. Next, the activity tracker may determine whether a teleconference or chat session is associated with the screen sharing session (step 605). A positive determination at step 605 may cause the activity tracker to register with the teleconference system (step 609). As noted above in FIG. 3, the teleconference system may be teleconference system 350 integrated to activity tracker 330, in a manner that permits activity tracker 330 to access context data repositories, as well as a teleconference mechanism, including, for example, real-time audio, messaging, and the like. By registering with the teleconference system, the activity tracker initiates a subscription to changes in the teleconference status.

A chat is an exchange of text messages between users on a computer network. The chat requires an initial connection from the chat initiator to a chat recipient, each of which operates a computer. The computers for each chat attendee make the connection persistent until terminated by one of the chat attendees. In other words, text messages entered to a computer screen for a user that has established a chat session will persistently be sent to the other chat attendees, so long as each of those attendees has not terminated the chat session and the local user has not terminated the chat session.

Following steps 605 and 609, the activity tracker may receive preliminary user input (step 610). Preliminary user input may be routine operations by a presenter to advance a presentation in one or more windows, for example, to advance a slide. The input can be preliminary, since the activity tracker may interpose a query, in the form, for example of a dialog box, to confirm a presenter's intentions. Next, the activity tracker may determine whether a new resource is added to the computer display (step 611). The activity tracker may receive a preliminary user input to access a second resource. Such preliminary user input can be, for example, user input to command the data processing system to render a resource, for example, a command to open an application to render a file. A command to render a resource may be, for example, clicking on a file icon, entering an application name to a command-line with a file name, selecting a recently opened file, and the like. Accordingly, in response to receiving such an input, activity tracker may make a positive determination that a new resource is added to the screen sharing session. The activity tracker may privately render the resource to the display in response to a positive outcome at step 611. A positive determination at step 611 may result in the activity tracker determining whether a new resource has been previously in the screen sharing session, and recently closed (step 613). A negative determination at step 613, may cause the activity tracker to determine whether the new resource is relevant to the session (step 615).

In response to the activity tracker determining that the second resource fails to satisfy the context and is therefore not relevant, the activity tracker may determine whether the screen sharing session is active (step 617). A negative determination at step 617, may cause processing to terminate.

However, a positive determination at step 617 may cause the activity tracker to display a dialog box to the presenter asking the presenter questions about the new resource (step 619). As a result, the activity tracker may determine whether the presenter requested to terminate the screen sharing session (step 631). In response to the positive determination to step 631 activity tracker may signal to the sharing controller to terminate the screen sharing session (step 641). Accordingly, the sharing controller may terminate the session (641). Contemporaneously with terminating the session, the activity tracker may clear the log. Processing may terminate thereafter.

If the presenter did not request to terminate the session, the activity tracker may determine whether the presenter has entered a choice to share the results (step 625). Steps 631 and 625 may include receiving user input to control the data of the new resource. In other words, the presenter may respond by acknowledging one of three choices. A first choice may be to transmit or share the new resource. A second choice may be to conceal or refrain from sharing the new resource. A third choice may be to end the screen sharing session. Further, steps 631 and 625 may be responsive to the presenter's submitted input into such a dialog box.

A positive determination in step 625 may cause the activity tracker to update a log with the resource information (step 661). Processing may continue at step 610.

Responsive to changes in the log, the sharing controller may asynchronously reference the log and update or otherwise share a resource marked to be shared in the log. Accordingly, the sharing controller, executing in the presenter computer, may share the first resource and the second resource based at least on a user input at steps 631 and/or 625.

The activity tracker updates a log concerning a resource to indicate that the resource is either to be shared in the screen sharing session, or alternatively that the resource is not to be shared in the screen sharing session. Accordingly, the log is a data structure that stores a binary value indicating the status for a resource to which the binary value is associated.

A negative determination at step 611 may cause the activity tracker to perform step 623. A negative determination means that there has not been a new resource added to the screen sharing session. Nevertheless, updates are periodically, and asynchronously entered to one or more shared resource. Accordingly, the sharing controller may continue to render updates to the screen sharing session.

Next, the activity tracker may determine whether a teleconference or chat has terminated (step 623). Termination of a meeting from a calendar may be determined by detecting if the current time is greater than the scheduled end time of the meeting. Termination of a teleconference may be determined by detecting if the presenter has hung up, a command has been sent to the teleconference provider that the host has hung up, or a command has been sent to the teleconference provider to disconnect all parties. Termination of a chat session may be determined by detecting that the presenter has closed their chat window or windows that were logged as relevant to the presentation, all other chat session participants have disconnected from the session, or the presenter has otherwise signified the chat session is terminated. If a teleconference or chat has not terminated, the activity tracker may perform step 661. Concurrently, the sharing controller may continue to render updates to the screen sharing session, responsive to a determination that the teleconference or chat is still occurring. The teleconference status may be determined by transmitting a status request to the teleconference system and receiving a response.

It is appreciated that a source or cause for terminating a teleconference or chat can vary depending on the embodiment. In addition to instant messaging or chat termination trigger a prompt to close screen sharing, at least two other events can trigger termination—depending on integration with additional applications. As a first example, a calendar entry in a calendar application may operate to start and to end a teleconference or chat based on a start time and an end time associated with a calendar entry coupled to the presenter's computer. Accordingly, the activity tracker can detect that the end time has occurred, and prompt the presenter for a confirmation that the conference is to end.

In a second example of events that may trigger termination, a presenter may be using a laptop as a presenter computer. Such a laptop, or other portable data processing system may be location aware by coupling an application to Global Positioning Satellites (GPS) or other wireless environments. Accordingly, such a presenter computer may detect that the presenter computer has reached a radio environment that is inconsistent with a teleconference or chat. For example, the presenter computer may be taken away from a corporate environment. As such, the detection of the absence of a corporate Wi-Fi can also trigger the activity tracker to prompt presenter for confirmation that the conference is to end.

However, if the teleconference or chat has terminated, activity tracker may continue to step 617, where the activity tracker will determine whether the screen sharing session is active (step 617). Similarly, the sharing controller may terminate rendering updates to the screen sharing session, responsive to a determination that the teleconference or chat has terminated, such as, by first notifying the user of the termination and prompting the presenter for confirmation to terminate rendering.

At step 625 the activity tracker may determine that a user has entered a choice not to share the resource. This negative determination, may cause the activity tracker to continue to step 610, with processing continuing thereafter.

An example of resources that may be determined by the activity tracker to be relevant or not relevant at step 615 follows. In this example, the user may start a presentation to one or more peers on the subject of IBM. Accordingly, 'IBM' is a keyword used to describe the context of the presentation. The user may provide the word 'IBM' as a keyword as preliminary user input by opening a world wide web browser session referencing the URL http://ibm.com. See, for example, the operation of resource A 411 and resource A 511 of FIGS. 4 and 5, respectively. Using this URL, the domain name provides metadata in the second level domain. The activity tracker can use the metadata as a screening criteria later at step 615. In other words, the term 'IBM' may be used to determine if a new resource satisfies or fails to satisfy the context.

Next, a break in the usual presentation may occur, for example, allowing peers to obtain coffee, respond to urgent emails, and the like. At this time, the presenter may chose to review a stock portfolio by opening a second window to a file, 'investment strategy.doc'. The activity tracker may detect that the new resource is added to the computer display at step 611. The file name of the resource may be parsed to obtain two metadata terms: 'investment' and 'strategy'. A comparison of these terms to 'IBM', the context, shows that neither term matches the context. The comparison may be performed using case insensitive matching, wild-cards, and other rough matching to one or more terms of a context. In addition, a comparison may be determined to be a match if a synonym is detected. Thus, a term "IBM" may be matched to metadata "International Business Machines". Accordingly, the activity tracker may continue by determining that a screen sharing session remains active (step 617) and displaying the dialog box (step 619). The dialog box may be, for example, dialog box 521 of FIG. 5.

Alternatively, a user may open an image with an image viewer of a file, 'IBM_logo.gif'. In this case, activity tracker may obtain a positive result at steps 613 and 615, and the activity tracker continues by updating the log with resource information concerning 'IBM_logo.gif' at step 661. The sharing controller may reference the log, and propagate rendering the image of 'IBM_logo.gif' to one or more peer computers. The user may make a selection, for example, of 'conceal resource B'. Accordingly, processing may continue at step 610, with processing continuing thereafter.

Figure 7:
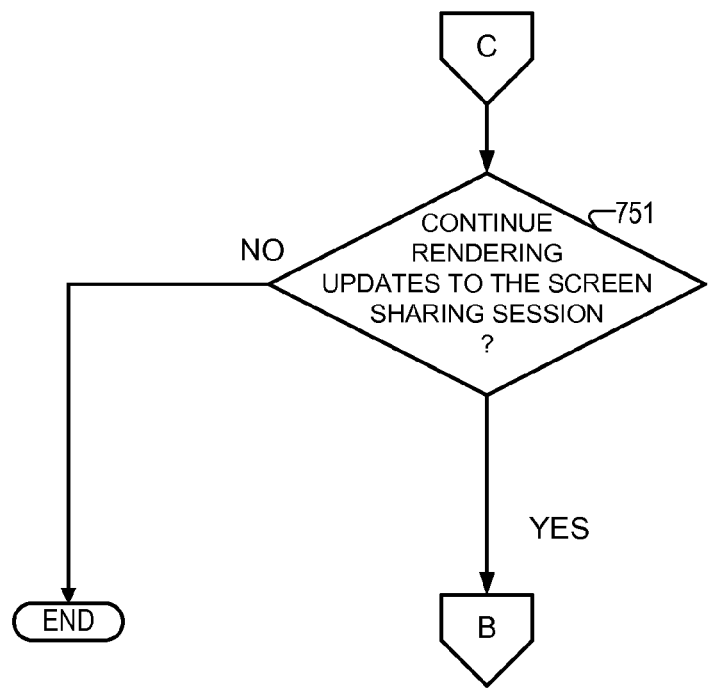
FIG. 7 is an optional flowchart addition to the flowchart of FIG. 6, in accordance with an illustrative embodiment of the invention.

FIG. 7 is an optional flowchart addition to the flowchart of FIG. 6, in accordance with an illustrative embodiment of the invention. The additional step or steps may be performed by the activity tracker in response to a positive determination at step 623 and negative determination at step 617, that is, in response to, respectively, a) determining that a teleconference or chat has terminated, and b) determining that a screen sharing session is active. Accordingly, the alternative embodiments may provide for the activity tracker to determine whether the presenter wants to continue rendering updates to the screen sharing session (step 751). In other words, the real-time conferencing may have concluded, and all windows and/or resources are no longer being shared. In response to an affirmative input from the presenter, the alternative embodiments may continue rendering updates and receive further user or presenter input by continuing at FIG. 6 step 610. In contrast, in response to a negative input from the presenter, the alternative embodiments may trigger the sharing controller to terminate the screen sharing session. Processing may terminate thereafter.

Figure 8:
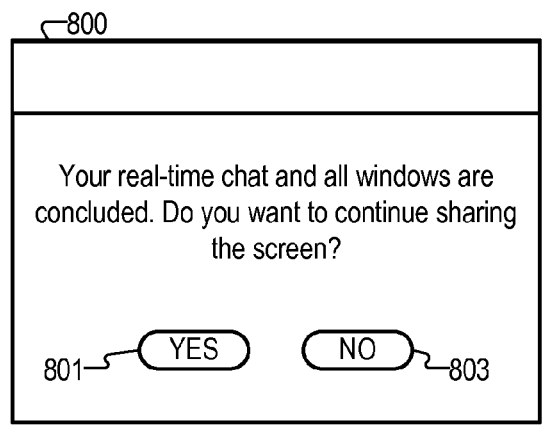
FIG. 8 is an optional dialog box that may be presented in accordance with an illustrative embodiment of the invention.

FIG. 8 is an optional dialog box that may be presented in accordance with an illustrative embodiment of the invention. Step 751, of FIG. 7, may be accompanied by the activity tracker displaying dialog 800 to the screen. Accordingly, a user may respond to a query "Do you want to continue sharing the screen?". A user may click on "yes" button 801 or "no" button 803.

It is appreciated that the user-controlled resources of a data processing system may vary widely. Examples of such resources can include, for example, a messaging contact, a universal resource locator, and a file, among others. Each resource may include metadata, for example, the messaging contact, may have a company name associated with the contact.

The illustrative embodiments provide for a user to be prompted for confirmation during a screen sharing session. The prompt for confirmation can be interposed in response to a user attempting to render or otherwise open a resource to a display on a presenter computer. Accordingly, the user may receive an interruption that requires the user to clarify intentions during an ongoing screen sharing session.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for selecting data to share in a screen sharing session, the method comprising:
    defining, at a first computer, a context for a screen sharing session;
    establishing, at the first computer, a shared link to a second computer, comprising authenticating a second user that uses the second computer;
    sharing, between the first computer and the second computer, at least a first resource rendered by a first application on the first computer, wherein the first application renders data of the first resource;
    receiving, at the first computer, a request by a first user to share a second resource;
    rendering, at the first computer, the second resource to form a rendered second resource, wherein a computer environment comprises the first resource and the second resource;
    determining, at the first computer, that the second resource fails to satisfy the context, and in response to a determination that the second resource fails to satisfy the context, displaying a dialog box which prompts the first user for a decision whether to share the second resource to the second computer, wherein the determination that the second resource fails to satisfy the context, comprises comparing the context to a tag, keyword, file name or file title within metadata associated with the second resource;
    receiving, at the first computer, a decision to share the second resource; and
    responsive to the decision to share the second resource, the first computer sharing the second resource to the second computer.

2. The method of claim 1, wherein sharing the second resource comprises rendering the second shared resource to the second computer.

3. The method of claim 1, further comprising:
    determining that a teleconference is occurring;
    receiving updates to the first resource; and
    responsive to a determination that the teleconference is occurring, rendering updates to the screen sharing session.

4. The method of claim 3, further comprising:
    determining that a teleconference has terminated; and
    responsive to a determination that the teleconference has terminated, terminating rendering updates to the screen sharing session.

5. The method of claim 1, wherein rendering the second resource to form a rendered second resource comprises privately rendering to a display local with respect to the request by the first user to render the second resource.

6. The method of claim 1, wherein sharing comprises transmitting rendering data of the resource.

7. A computer program product for selecting a resource to share in a screen sharing session, the computer program product comprising:
    a computer readable storage device having computer readable program code stored thereon, the computer readable program code comprising:
    computer readable program code configured to define a context for a screen sharing session;
    computer readable program code configured to establish a shared link to a second computer, comprising authenticating a second user that uses the second computer;
    computer readable program code configured to share, between a first computer and a second computer, at least a first resource rendered by a first application on the first computer, wherein the first application renders data of the first resource;

computer readable program code configured to receive a request by a first user to share a second resource;

computer readable program code configured to render the second resource to form a rendered second resource, wherein a computer environment comprises the first resource and the second resource;

computer readable program code configured to determine that the second resource fails to satisfy the context, wherein the determination that the second resource fails to satisfy the context, comprises comparing the context to a tag, keyword, file name, or file title within metadata associated with the second resource;

computer readable program code configured to display a dialog box which prompts the first user for a decision whether to share the second resource to the second computer, responsive to a determination that the second resource fails to satisfy the context;

computer readable program code configured to receive, at the first computer, a decision to share the second resource; and computer readable program code configured to share to the second computer the second resource responsive to the decision to share the second resource.

8. The computer program product of claim 7, wherein computer readable program code configured to share the second resource comprises computer readable program code configured to render the second shared resource to the second, wherein the decision to share comprises a request to share the second resource.

9. The computer program product of claim 7, further comprising:

computer readable program code configured to determine that a teleconference is occurring;

computer readable program code configured to receive updates to the first resource; and computer readable program code configured to render updates to the screen sharing session, responsive to a determination that the teleconference is occurring.

10. The computer program product of claim 9, further comprising:

computer readable program code configured to determine that a teleconference has terminated; and computer readable program code configured to terminate rendering updates to the screen sharing session, responsive to a determination that the teleconference has terminated.

11. The computer program product of claim 7, wherein computer readable code configured to render the second resource to form a rendered second resource comprises computer readable code configured to privately render to a display local with respect to the request by the first user to render the second resource.

12. The computer program product of claim 7, wherein computer readable program code configured to share comprises computer readable program code configured to transmit rendering data of the resource.

13. A data processing system for selecting a resource to share in a screen sharing session, the data processing system comprising:

one or more a processors, a computer-readable memory, a computer-readable storage device and program instructions stored on the computer-readable storage device for execution by the one or more processors via the computer-readable memory, the program instructions comprising:

first program instructions to define a context for a screen sharing session;

second program instructions to establish a shared link to a second computer, comprising authenticating a second user that uses the second computer;

third program instructions to share, between the first computer and the second computer, at least a first resource rendered by a first application on the first computer, wherein the first application renders data of the first resource;

fourth program instructions to receive a request by a first user to share a second resource;

fifth program instructions to render the second resource to form a rendered second resource, wherein a computer environment comprises the first resource and the second resource;

sixth program instructions to determine that the second resource fails to satisfy the context, wherein the determination that the second resource fails to satisfy the context, comprises comparing the context to a tag, keyword, file name or file title within metadata associated with the second resource;

seventh program instructions to display a dialog box which prompts the first user for a decision whether to share the second resource to the second computer, responsive to a determination that the second resource fails to satisfy the context;

eighth program instructions to receive a decision to share the second resource; and ninth program instructions to share the second resource responsive to the decision to share the second resource.

14. The data processing system of claim 13, wherein ninth program instructions to share the second resource comprises program instructions to render the second shared resource to the second computer.

15. The data processing system of claim 13, wherein the program instructions further comprise:

tenth program instructions to determine that a teleconference is occurring;

eleventh program instructions to receive updates to the first resource; and twelfth program instructions to render updates to the screen sharing session, responsive to a determination that the teleconference is occurring.

16. The data processing system of claim 15, wherein the program instructions further comprise:

tenth program instructions to determine that a teleconference has terminated; and eleventh program instructions to terminate rendering updates to the screen sharing session, responsive to a determination that the teleconference has terminated.

17. The data processing system of claim 13, wherein fifth program instructions to render the second resource to form a rendered second resource comprises program instructions to privately render to a display local with respect to the request by the first user to render the second resource.

* * * * *